United States Patent
Paglieri et al.

(10) Patent No.: US 12,220,666 B2
(45) Date of Patent: Feb. 11, 2025

(54) ULTRATHIN MEMBRANE FABRICATION

(71) Applicant: Saudi Arabian Oil Company, Dhahran (SA)

(72) Inventors: Stephen N. Paglieri, Dhahran (SA); Zainb S. Alismail, Qatif (SA); Aadesh Harale, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 1058 days.

(21) Appl. No.: 17/147,330

(22) Filed: Jan. 12, 2021

(65) Prior Publication Data
US 2022/0219124 A1  Jul. 14, 2022

(51) Int. Cl.
*B01D 71/00* (2006.01)
*B01D 53/22* (2006.01)
(Continued)

(52) U.S. Cl.
CPC ......... *B01D 65/108* (2013.01); *B01D 53/228* (2013.01); *B01D 65/102* (2013.01); *B01D 67/0083* (2013.01); *B01D 67/0088* (2013.01); *B01D 69/02* (2013.01); *B01D 69/04* (2013.01); *B01D 69/108* (2022.08); *B01D 69/12* (2013.01); *B01D 69/122* (2013.01); *B01D 71/02231* (2022.08); *B01D 71/0227* (2022.08);
(Continued)

(58) Field of Classification Search
CPC ......... B01D 69/10; B01D 69/04; G01M 3/06; C01B 3/505
See application file for complete search history.

(56) References Cited

U.S. PATENT DOCUMENTS 3,344,586 A 10/1967 Langley et al.
4,981,676 A 1/1991 Minet et al.
(Continued)

FOREIGN PATENT DOCUMENTS

AU 2003286894 6/2004
AU 2005286952 3/2006
(Continued)

OTHER PUBLICATIONS

PCT Invitation to Pay Additional Fees and, where applicable, Protest Fee in International Appln. No. PCT/US2022/012102, dated May 3, 2022, 15 pages.
(Continued)

*Primary Examiner* — Jamel E Williams
(74) *Attorney, Agent, or Firm* — Fish & Richardson P.C.

(57) ABSTRACT

A hydrogen-selective membrane including a metal leaf applied to a substrate. A system and method for fabricating a hydrogen-selective membrane, including applying a metal leaf to a substrate, annealing the metal leaf, applying a hydrogen-permeable metal to the annealed metal leaf on the substrate, and annealing the hydrogen-permeable metal and the annealed metal leaf to give an alloy of the hydrogen-permeable metal and the metal leaf. A system and method for repairing a hydrogen-selective membrane having defects including applying a metal leaf to an external surface of membrane material of the hydrogen-selective membrane, annealing the metal leaf and metal of the membrane material to form an alloy of the metal leaf and the metal to repair the defects.

14 Claims, 3 Drawing Sheets

(51) Int. Cl.
  *B01D 65/10* (2006.01)
  *B01D 67/00* (2006.01)
  *B01D 69/02* (2006.01)
  *B01D 69/04* (2006.01)
  *B01D 69/10* (2006.01)
  *B01D 69/12* (2006.01)
  *B01D 71/02* (2006.01)
  *C01B 3/50* (2006.01)
  *G01M 3/06* (2006.01)

(52) U.S. Cl.
  CPC ............. *C01B 3/505* (2013.01); *G01M 3/06* (2013.01); *B01D 2053/223* (2013.01); *B01D 2325/04* (2013.01)

(56) References Cited

U.S. PATENT DOCUMENTS

| | | |
|---|---|---|
| 5,229,102 A | 7/1993 | Minet et al. |
| 5,366,712 A | 11/1994 | Violante |
| 5,746,985 A | 5/1998 | Takahashi |
| 5,782,960 A | 7/1998 | Ogawa et al. |
| 5,904,754 A | 5/1999 | Juda et al. |
| 5,997,594 A | 12/1999 | Edlund et al. |
| 6,119,606 A | 9/2000 | Clark |
| 6,153,163 A | 11/2000 | Prasad |
| 6,180,081 B1 | 1/2001 | Poschmann et al. |
| 6,238,465 B1 | 5/2001 | Juda et al. |
| 6,296,686 B1 | 10/2001 | Prasad et al. |
| 6,338,833 B1 | 1/2002 | Aasberg-Petersen |
| 6,830,596 B1 | 12/2004 | Deckman et al. |
| 6,960,235 B2 | 11/2005 | Morse et al. |
| 7,022,165 B2 | 4/2006 | Paglieri et al. |
| 7,025,941 B1 | 4/2006 | Autenrieth et al. |
| 7,182,917 B2 | 2/2007 | Krueger |
| 7,217,304 B2 | 5/2007 | Deckman et al. |
| 7,323,148 B2 | 1/2008 | Shah et al. |
| 7,353,982 B2 | 4/2008 | Li |
| 7,390,536 B2 | 6/2008 | Ma et al. |
| 7,527,661 B2 | 5/2009 | Chellappa et al. |
| 7,959,897 B2 | 6/2011 | Cui et al. |
| 8,119,205 B2 | 2/2012 | Roa et al. |
| 8,163,064 B2 | 4/2012 | Bredesen et al. |
| 8,518,151 B2 | 8/2013 | Tessier et al. |
| 8,563,185 B2 | 10/2013 | Assink et al. |
| 8,597,383 B2 | 12/2013 | Pham et al. |
| 8,721,773 B2 | 5/2014 | Perkins, II et al. |
| 8,747,766 B2 | 6/2014 | Noda |
| 8,778,058 B2 | 7/2014 | Way et al. |
| 8,900,546 B2 | 12/2014 | Van De Graaf et al. |
| 9,044,715 B2 | 6/2015 | Way et al. |
| 9,138,718 B2 | 9/2015 | Li et al. |
| 9,493,350 B2 | 11/2016 | Morico et al. |
| 2003/0041519 A1 | 3/2003 | Maruko |
| 2003/0172589 A1 | 9/2003 | Krueger |
| 2004/0120889 A1 | 6/2004 | Shah et al. |
| 2005/0045034 A1 | 3/2005 | Paglieri et al. |
| 2005/0109037 A1 | 5/2005 | Deckman et al. |
| 2005/0109821 A1 | 5/2005 | Li |
| 2006/0013759 A1 | 1/2006 | Jiang et al. |
| 2006/0057060 A1 | 3/2006 | Sun et al. |
| 2006/0124445 A1 | 6/2006 | Labrecque et al. |
| 2007/0157517 A1 | 6/2007 | Tsay et al. |
| 2007/0180991 A1 | 8/2007 | Chellappa et al. |
| 2011/0076225 A1 | 3/2011 | Shah et al. |
| 2011/0177410 A1 | 7/2011 | Assink et al. |
| 2012/0128999 A1 | 5/2012 | Way et al. |
| 2012/0195824 A1 | 8/2012 | Van De Graaf et al. |
| 2014/0170061 A1 | 6/2014 | Chaubey et al. |
| 2014/0363345 A1 | 12/2014 | Li et al. |
| 2015/0037246 A1 | 2/2015 | Morico et al. |
| 2016/0214859 A1 | 6/2016 | Beltramini et al. |
| 2016/0340187 A1 | 11/2016 | Said et al. |
| 2018/0079643 A1 | 3/2018 | Mortensen et al. |
| 2020/0023304 A1 | 1/2020 | Balzer et al. |

FOREIGN PATENT DOCUMENTS

| | | | | |
|---|---|---|---|---|
| AU | 2005287034 | | 3/2006 | |
| AU | 2010291148 | | 3/2011 | |
| AU | 2012243063 | | 10/2012 | |
| CA | 2458314 | | 4/1999 | |
| CA | 2580580 | | 3/2006 | |
| CA | 2580585 | | 3/2006 | |
| CA | 2547011 | | 8/2008 | |
| CA | 2414657 | | 5/2011 | |
| CA | 2938299 | | 5/2015 | |
| CN | 102861517 | | 1/2013 | |
| CN | 102861517 A * | | 1/2013 | |
| CN | 104098071 | | 10/2014 | |
| CN | 102482079 | | 5/2016 | |
| CN | 103596671 | | 6/2016 | |
| CN | 105197887 | | 3/2017 | |
| CN | 105776133 | | 11/2017 | |
| CN | 105633420 | | 4/2018 | |
| EP | 130933 | | 9/1987 | |
| EP | 684066 | | 11/1995 | |
| EP | 1024111 | | 8/2000 | |
| EP | 1294637 | | 3/2003 | |
| EP | 1789171 | | 5/2007 | |
| EP | 1789172 | | 5/2007 | |
| EP | 1829821 | | 9/2007 | |
| EP | 2035329 | | 3/2009 | |
| EP | 909804 | | 9/2010 | |
| EP | 1499452 B1 * | | 12/2013 | ......... B01D 67/0069 |
| EP | 2696966 | | 2/2014 | |
| EP | 2825503 | | 1/2015 | |
| EP | 2473441 | | 8/2018 | |
| FR | 2943657 | | 3/2009 | |
| JP | H09278403 | | 10/1997 | |
| JP | 2943657 | | 8/1999 | |
| JP | 2001348205 | | 12/2001 | |
| JP | 2004502623 | | 1/2004 | |
| JP | 2004249264 | | 9/2004 | |
| JP | 2004352528 | | 12/2004 | |
| JP | 2007190455 | | 8/2007 | |
| JP | 2008513337 | | 5/2008 | |
| JP | 2008513338 | | 5/2008 | |
| JP | 4381033 | | 10/2009 | |
| JP | 2010266155 | | 11/2010 | |
| JP | 2011195352 | | 10/2011 | |
| JP | 2011195387 | | 10/2011 | |
| JP | 2011206612 | | 10/2011 | |
| JP | 2013503807 | | 2/2013 | |
| JP | 5390448 | | 10/2013 | |
| JP | 5588581 | | 8/2014 | |
| JP | 2014519463 | | 8/2014 | |
| JP | 5611627 | | 9/2014 | |
| JP | 2014169222 | | 9/2014 | |
| JP | 6040701 | | 12/2016 | |
| JP | 6345406 | | 6/2018 | |
| NO | 200701530 | | 4/2007 | |
| NO | 200701532 | | 6/2007 | |
| TW | 200619136 | | 6/2006 | |
| TW | 200630158 | | 9/2006 | |
| WO | 2000009633 | | 2/2000 | |
| WO | 2001064577 | | 9/2001 | |
| WO | 2002002460 | | 1/2002 | |
| WO | 2002070402 | | 9/2002 | |
| WO | WO 2004021481 | | 3/2004 | |
| WO | 2004041714 | | 5/2004 | |
| WO | 2005051590 | | 6/2005 | |
| WO | 2006034086 | | 3/2006 | |
| WO | 2006034100 | | 3/2006 | |
| WO | 2006034103 | | 3/2006 | |
| WO | 2006082933 | | 8/2006 | |
| WO | 2006097703 | | 9/2006 | |
| WO | 2007031713 | | 3/2007 | |
| WO | 2008000782 | | 1/2008 | |
| WO | 2009073436 | | 6/2009 | |
| WO | 2010009077 | | 1/2010 | |
| WO | 2010009082 | | 1/2010 | |
| WO | 2010009089 | | 1/2010 | |
| WO | 2010109106 | | 9/2010 | |
| WO | 2010143783 | | 12/2010 | |

(56) References Cited

FOREIGN PATENT DOCUMENTS

| WO | 2011026943 | 3/2011 |
|---|---|---|
| WO | 2012006429 | 1/2012 |
| WO | 2012142009 | 10/2012 |
| WO | 2012143096 | 10/2012 |
| WO | 2012158673 | 11/2012 |
| WO | 2013137720 | 9/2013 |
| WO | 2015128045 | 9/2013 |
| WO | 2015183200 | 12/2015 |
| WO | 2016207892 | 12/2016 |
| WO | 2018226617 | 12/2018 |
| ZA | 2012001141 | 10/2012 |

OTHER PUBLICATIONS

Abbassi et al., "Efficiency improvements in production profiling using ultracompact flow array sensing technology," Petrophysics, Aug. 2018, 59(4):457-488.

Amo et al., "Low-Quality Natural Gas Sulfur Removal/Recovery," Membrane Technology and Research, Doe Report DE-AC21-92MC28133-01, Jan. 29, 1998, 107 pages.

Aschoundong et al., "Silane Modification of Cellulose Acetate Dense Films as Materials for Acid Gas Removal Macromolecules," Macromolecules, Jul. 2013, 46(14), 11 pages.

Belov et al., "Gas transport and free volume in hexafluoropropylene polymers," Journal of Membrane Science, Nov. 2011, 383, 8 pages.

Bernardo et al., "Gas transport properties of Pebax/room temperature ionic liquid gel membranes," Separation and Purification Technology, Sep. 2012, 97, 13 pages.

Bhide et al., "Hybrid processes for the removal of acid gases from natural gas," Journal of Membrane Science, Mar. 1998, 140(1), 2 pages, Abstract Only.

Chatterjee et al., "Poly(ether urethane) and poly(ether urethane urea) membranes with high $H_2S/CH_4$ selectivity," Journal of Membrane Science, Nov. 1997, 135(99), 8 pages.

Coulter et al., "Sulfur tolerant PdAu and PdAuPt allow hydrogen separation membranes," Journal of Membrane Science, 2012, 405-406:11-19.

Jansen et al., "On the unusual solvent and the effect on the gas transport in perfluorinated Hyflon AD Membranes," Journal of Membrane Science, Jan. 2007, 287(1), 6 pages.

Klette et al., "Sputtering of very thin palladium-alloy hydrogen separation membranes," Membrane Technology, May 2005, 3 pages.

Kraftschik et al., "Dense film polyimide membranes for aggressive sour gas feed separations," Journal of Membrane Science, Feb. 2013, 428, 12 pages.

Lallemand et al., "Extending the treatment of highly sour gases: cryogenic distillation," Digital Refining: Processing, Operations & Maintenance, Jan. 2014, 8 pages.

Lallemand et al., "Highly sour gas processing: Bulk removal with SPREX Process," IPTC-10581-MS, International Petroleum Technology Conference, Nov. 2005, 18 pages.

Lallemand et al., "Solutions for the treatment of highly sour gases," Digital Refinding: Processsing, Operations & Maintenance, Apr. 2012, 14 pages.

Lockhart, "Sour oil and gas management: 3.3," vol. Lii/New Developments: Energy, Transport, Sustainability Encyclopedia of Hydrocarbons, 2007, 34 pages.

Lokhandwala et al., "Membrane separation of nitrogen from natural gas: a case study from membrane synthesis to commercial deployment," Journal of Membrane Science, Jan. 2010, 346, 10 pages.

Merkel and Toy, "Comparison of Hydrogen Sulfide Transport Properties in Fluorinated and Nonfluorinated Polymers," Macromolecules, Sep. 2006, 39(22), 10 pages.

Mori et al., "Reactor configuration and concentration polarization in methane steam reforming by a membrane reactor with a highly hydrogen-permeable membrane," Industrial & Engineering Chemistry Research, Feb. 2007, 46(7):1952-1958.

Oi et al., "Simulation and cost comparison of CO2 liquefaction," Energy Procedia, 2016, 86:500-510.

Robeson, "The upper bound revisited," Journal of Membrane Science, Jul. 2008, 320, 11 pages.

Rufford et al., "The removal of CO2 and N2 from natural gas: a review of conventional and emerging process technologies," Journal of Petroleum Science and Engineering, Sep. 2012, 94-95, 32 pages.

Tosti et al., "Diffusion Bonding of Pd-Ag Rolled Membranes", Journal of Materials Science, 2004, 39:3041-3046.

Wismann et al., "Electrified methane reforming: a compact approach to greener industrial hydrogen production," Science Magazine, May 2019, 364(6442):756-759.

Xu et al., "An Improved CO2 Separation and Purification System Based on Cryogenic Separation and Distillation Theory," Energies ISSN 1996-1073, May 2014, 7:3484-3502.

PCT International Search Report and Written Opinion in International Appln. No. PCT/US2022/012102, dated Jun. 24, 2022, 16 pages.

* cited by examiner

US 12,220,666 B2

ULTRATHIN MEMBRANE FABRICATION

TECHNICAL FIELD

This disclosure relates to hydrogen-selective membranes.

BACKGROUND

Hydrogen may be separated from mixed-gas streams. In some cases, the separated hydrogen may be a feedstock for a downstream process or a product for distribution. Hydrogen may be processed to remove impurities. Hydrogen can be purified through several techniques, such as pressure swing adsorption (PSA), cryogenic distillation, or membrane separation.

Hydrogen-selective membranes may be utilized to separate hydrogen from mixed gas streams to produce high-purity hydrogen. For example, membranes as thin films of palladium or palladium alloys may be employed for separating hydrogen.

The driving force for hydrogen separation via a membrane may be a pressure gradient. For instance, a high-pressure feed gas mixture having the hydrogen may be applied to one side of a hermetically sealed membrane while maintaining a relatively low pressure on the opposite side.

SUMMARY

An aspect relates to a method of fabricating a hydrogen-selective membrane, including applying a metal leaf to a substrate, annealing the metal leaf on the substrate to give an annealed metal leaf on the substrate, and applying a hydrogen-permeable metal to the annealed metal leaf on the substrate. The method includes annealing the hydrogen-permeable metal and the annealed metal leaf to give an alloy of the hydrogen-permeable metal and the metal leaf. The hydrogen-selective membrane includes the alloy disposed on the substrate.

Another aspect is a method of fabricating a hydrogen-selective membrane, including applying a metal leaf including a first metal to a substrate, annealing the metal leaf on the substrate to give an annealed metal leaf on the substrate, and applying a hydrogen-permeable metal including a second metal to the annealed metal leaf. The method includes annealing the hydrogen-permeable metal and the annealed metal leaf to give an alloy of the first metal and the second metal. The hydrogen-selective membrane includes the alloy disposed on the substrate.

Yet another aspect relates to a method of repairing a hydrogen-selective membrane having defects. The method includes applying a metal leaf to an external surface of membrane material of the hydrogen-selective membrane having defects. The membrane material includes metal that is hydrogen selective and has the defects. The method includes annealing the metal leaf and the metal to form an alloy of the metal leaf and the metal to repair the defects, and then testing the repair.

The details of one or more implementations are set forth in the accompanying drawings and the description below. Other features and advantages will be apparent from the description and drawings, and from the claims.

DETAILED DESCRIPTION

Figure 1:
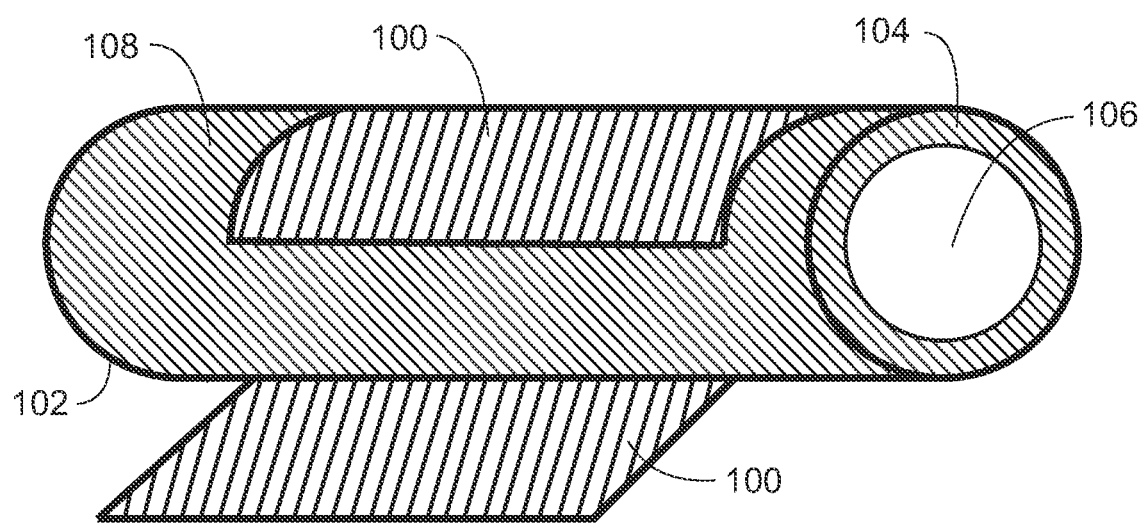
FIG. 1 and FIG. 2 are diagrams depicting a metal leaf being wrapped around a tubular substrate in the fabrication of a hydrogen-selective membrane.

The disclosure is directed to hydrogen selective membranes. To form the membrane, a high-purity metal leaf (e.g., nonporous) is applied directly to a hydrogen-permeable substrate (e.g., tubular or planar) by pressing the metal leaf onto the substrate (support) and then annealing. The substrate as porous can be ceramic or metal. The metal leaf may be a metal film, such as gold foil. The metal leaf (e.g., gold) may have a thickness less than 200 nanometers (nm) or less than 100 nm. After annealing of the applied metal leaf, a thin layer of hydrogen-permeable metal (e.g., palladium) may then be applied (e.g., coated at less than 200 nm thickness) onto the annealed metal leaf on the substrate and annealed to form an alloy (e.g., palladium-gold alloy) that is permeable to hydrogen and can be resistant to hydrogen sulfide, and give thermal stability and chemical stability. The alloy may be considered the membrane material and have a thickness, for example, less than 400 nm. This is in contrast to other hydrogen-selective membranes having membrane material thickness greater than 1 micron (μm), such as 5-10 μm, and which incorporate a greater amount of a costly precious metal (e.g., palladium). Embodiments of the present techniques may also be employed to plug defects or pores on the surface of an existing palladium or palladium alloy membranes by covering the palladium or palladium alloy membranes with a metal leaf (e.g., gold) and annealing.

Thus, embodiments may relate to utilizing metal leaves to fabricate or repair hydrogen selective membranes. The membranes incorporate the metal leaf. A metal leaf may be an ultrathin metal foil or an ultrathin metal sheet. The metal leaf may be, for example, gold, silver, platinum or copper, and so on. In addition to being ultrathin, e.g., less than 200 nm, the metal leaf may be high-purity (e.g., 99.9% pure) in the given metal.

Gold may be more malleable than silver, platinum, or copper and thus provide for thinner metal sheets. Embodiments herein may apply a sheet(s) of metal leaf (e.g., gold leaf or gold foil) to cover a substrate to form a continuous, nonporous membrane. As indicated, the thickness of the metal leaf may be, for example, less than 200 nm, less than 150 nm, or less than 100 nm.

The substrate may be labeled as a membrane support. The substrate may generally be a hydrogen-permeable substrate. The substrate or membrane support may be a porous ceramic, porous metal, hydrogen-permeable metal, or hydrogen-permeable polymer, or any combinations thereof. The substrate can be, for example, tubular or planar, or an irregular shape.

As mentioned, to cover the substrate with the metal leaf, the metal leaf may be applied to the substrate and annealed. The annealing may be in gas, such as air, nitrogen, or hydrogen. The gas may be pressurized. On the other hand, the annealing may be under vacuum.

Palladium (and additional metal or metals) may then be applied onto the gold foil (as annealed) and annealed at high temperature in air or hydrogen to form an alloy (e.g., palladium-gold) with specific gas separating abilities and improved properties. For example, certain palladium-gold alloys are more permeable to hydrogen and resistant to hydrogen sulfide ($H_2S$). Another aspect of the present techniques may involve plugging defects or pores on the surface of an existing palladium or palladium-alloy membrane by covering the membrane with gold leaf and annealing. Whether a new fabrication or repair, once the membrane is formed, the membrane can be sealed into a gas separating device utilizing, for example, conventional technologies such as gaskets or compression fittings with graphite ferrules.

Figure 2:
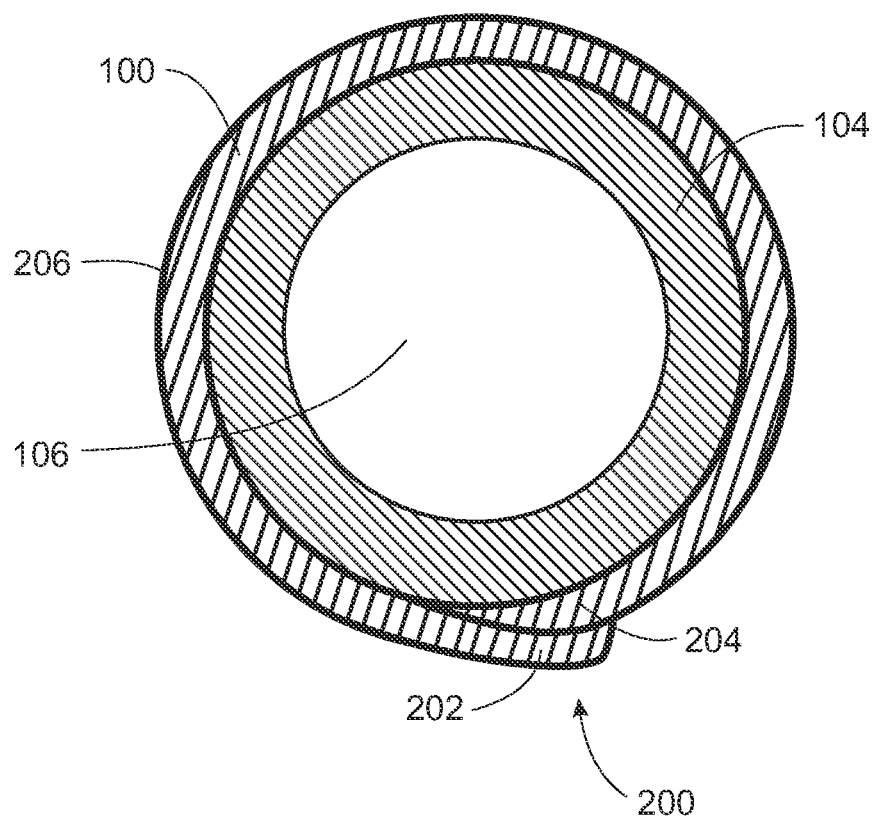

FIG. 1 and FIG. 2 depict a metal leaf 100 being wrapped around a tubular substrate 102 in the fabrication of a hydrogen-selective membrane. FIG. 1 shows the metal leaf 100 as wrapped partially around the circumference of the substrate 102 in the process of being wrapped fully around the circumference of the substrate 102. FIG. 2 is later in time and shows the metal leaf 100 as wrapped about the circumference of the substrate 102. One or more sheets of metal leaf 100 may wrapped around the tubular substrate 102. The tubular substrate 102 may be labeled as a tubular support or tubular membrane support. While FIGS. 1-2 depict a tubular substrate, the present techniques are applicable to substrates that are planar or having other geometry.

The tubular substrate 102 has a wall 104 and an inner cavity 106. The wall 104 is the substrate material, which may typically be porous. The tubular substrate 102 may generally be a hydrogen-permeable substrate. The wall 104 may have a specified wall thickness. The wall 104 may have a specified outer diameter and/or specified inside diameter. The inner cavity 106 may be characterized as a bore or lumen. The inner cavity 106 may be the lumen of the hydrogen-selective membrane that is formed.

In the fabrication of a hydrogen-selective membrane, the metal leaf 100 is applied to (and shown being wrapped onto) an exterior surface 108 (outer diameter) of the substrate wall 104. The exterior surface 108 may be the exterior or external surface of the tubular substrate 102.

In certain embodiments, the metal leaf 100 is a gold leaf having a thickness less than 150 nm or less than 100 nm. A sheet(s) of the metal leaf (e.g., gold leaf) may be applied onto the hydrogen-permeable substrate 102 by wrapping and pressing the metal leaf 100 onto the substrate 102 by hand or with a tool. The metal leaf 100 may be transferred from its substrate (typically paper) onto the membrane substrate 102 utilizing, for example, a brush. In some implementations, subsequently an agate-tipped burnishing tool may be employed to smooth the thin foil over the surface 108 of the substrate 102 for better adherence. For more than one sheet of the metal leaf 100 applied, the cumulative thickness of the sheets may be, for example, less than 200 nm, less than 150 nm, or less than 100 nm. Moreover, the metal leaf 100 may be applied such that the metal leaf 100 overlaps 200 (see FIG. 2) and sticks to itself. In other words, the overlapping end portions 202, 204 (as indicated at reference numeral 200) of the metal leaf 100 may stick to each other. A first (outer) end portion 202 overlaps a second (inner) end portion 204. The end portion 202 and the end portion 204 may stick to each other. Thereafter, upon heating (e.g., in air), the metal leaf 100 may diffusion bond to itself forming a hermetic seal. In other words, the two overlapping portions 202, 204 may diffusion bond to each other to form the hermetic seal.

This heating for the diffusion bonding of the overlapping portions 202, 204 may be performed in the annealing of the metal leaf 100 applied to the substrate 102. The annealing of the metal leaf 100 on the substrate 102 may be performed, for example, at a temperature of at least 550° C. (or at least 600° C.), or in a range of 500° C. to 700° C., for at least 5 hours, at least 10 hours, at least 12 hours, or at least 16.5 hours, or for a duration in a range of 6 to 24 hours. In some implementations, the annealing is performed in air. The annealing may be performed, for example, in an oven (e.g., industrial oven) or furnace (e.g., a direct fired heater). The structure having the metal leaf 100 applied to the underlying substrate 102 may be placed into the oven or furnace and subjected to the annealing temperature for the specified duration.

After the metal-leaf 100 film as wrapped, pressed, and annealed has been formed on the surface 108 of the porous support 102, a hydrogen-permeable metal, such as palladium, may be applied onto the annealed metal-leaf 100 film. Metal-deposition techniques, such as physical vapor deposition (e.g., magnetron sputtering or electron-beam evaporation), chemical vapor deposition, electroless plating, or electroplating, may be employed to coat the annealed metal-leaf 100 film with a thin layer (e.g., less than 200 nm) of the hydrogen-permeable metal, such as palladium. The thin-layer hydrogen-permeable metal (not shown) may be applied to the exterior surface 206 of the annealed metal leaf 100. A palladium leaf or palladium-alloy leaf may also be applied.

The resulting dual-layer film, as the combination of the hydrogen-permeable metal (e.g., palladium) and the underlying annealed metal leaf 100 (e.g., gold), is then annealed. This annealing is an annealing of the hydrogen-permeable metal and a re-annealing of the metal-leaf 100 film. The annealing conditions of the bilayer film may be similar to that of the initial annealing of the metal leaf 100. The annealing of this bi-layer film (e.g., layer of hydrogen-permeable metal on layer of annealed metal leaf 100) may be performed, for example, at a temperature of at least 550° C. (or at least 600° C.) for a duration in a range of 6 hours to 24 hours. The annealing temperature may be in a range of 500° C. to 700° C. The duration of the annealing may be at least 5 hours, at least 12 hours, or at least 16.5 hours. As indicated, the annealing may be performed, for example, in an oven or furnace.

For the hydrogen-permeable metal as palladium, a palladium alloy may be formed in the annealing of the dual layer. The palladium alloy may be a palladium-gold alloy if the metal leaf 100 is gold leaf. In implementations, the palladium alloy may have superior properties to pure palladium, such as higher hydrogen permeability and/or greater thermal and chemical stability. An additional layer of metal leaf may be applied on top of the palladium alloy (and the structure subject to annealing again) if additional alloying material (or an additional element) is desired in the alloy, and to seal off any defects in the film.

Lastly, with respect to annealing, the initial annealing of the metal leaf 100 may be carried out at a temperature and duration so that the metal leaf 100 diffusion bonds to itself where the metal leaf 100 overlaps 200 itself and seals any leaks. The annealing process may also promote that the metal leaf 100 bonds to the substrate so that the metal leaf 100 will not flake off (or promote that the metal leaf bonds to palladium or palladium alloy if the metal leaf is applied onto an existing palladium film in repair or treatment of a membrane). The annealing may be performed in air. The subsequent annealing of the aforementioned bi-layer (dual layer) or multi-layer may be carried out, for example, under air or hydrogen at high temperatures and pressures (e.g. at least 550° C. and at least 30 bar) to form a homogeneous alloy (e.g., Pd—Au alloy) film. Again, this annealing temperature and duration may be, for example, between 500° C.-700° C. for 6-24 hours.

In summary, the hydrogen-selective membrane may be formed via applying metal leaf to a substrate, annealing the metal leaf, applying hydrogen-permeable metal to the annealed metal leaf, and subsequent annealing. The hydrogen-selective membrane may be utilized to separate hydrogen from gas mixtures. For example, the membrane may be coupled to a gas carrying line, such as via compression fittings with graphite ferrules to form a gas-tight seal around the membrane. Other forms of connecting and sealing the membrane for operation are applicable. Moreover, a variety of systems may employ the hydrogen-selective membrane.

A hydrogen-separating membrane that is thin and generally defect-free may be beneficial. Efficiently separating and purifying hydrogen may be advantageous for industrial processes, such as hydrogen production, refining, chemical production, ammonia production, steelmaking, and semiconductor manufacturing. A cost-effective membrane for recovering hydrogen may increase the economic and environmental sustainability of such operations. Hydrogen-separating membranes (hydrogen-selective membranes) with high permeability and high separation factors may be scaled up in both size (e.g., length and surface area) and quantity to meet the demand for industrial modules.

As indicated, embodiments of the present techniques disclosed herein may substantially reduce the amount of expensive metals (e.g., palladium) utilized to fabricate hydrogen-separating (hydrogen-selective) membranes and therefore may be desirable. In contrast, freestanding metal membranes and supported thin-film membranes composed of palladium and palladium alloys have generally been thicker than 1 μm, and are typically 5-10 μm thick, to reduce the number of defects (e.g., pinholes) in the membrane. Furthermore, thinner membranes of present embodiments, in addition to saving material cost, may also give improved performance because the hydrogen flux (rate of diffusion) through the membrane is generally inversely proportional to the membrane thickness. Moreover, the fabrication techniques may be scalable so to fabricate large membrane surface-areas for incorporation into industrial-scale hydrogen-separation modules.

Supported thin-film palladium membranes may be fabricated by coating palladium directly on a porous substrate, such as by deposition or plating. However, to cover the pores of the substrate (support), a quantity of palladium metal sufficient to bridge the largest pores is deposited. In contrast, embodiments herein may apply a smaller quantity (e.g., much smaller quantity) of palladium because the palladium is applied to a metal leaf and not directly to the substrate. The metal leaf (instead of palladium) as a continuous foil is applied directly to the substrate. The ultrathin metal leaf can cover the pores by spanning across the pores. Therefore, less palladium than typical can be deposited (on top of the metal). Furthermore, the presence of the applied ultrathin metal film may facilitate deposition of palladium and palladium alloys utilizing electroplating because the metal surface is conductive. Electroplating can be by either sequential deposition of palladium and then another metal (or metals), or co-deposition of palladium with another metal(s), and so on. In the fabrication of supported thin-film palladium membranes (hydrogen-selective membranes), techniques that may coat palladium on a porous substrate or on an annealed metal leaf (e.g., gold) formed on the porous substrate may include physical vapor deposition (e.g. sputtering or e-beam evaporation), chemical vapor deposition, electroless plating, and electroplating, and so forth.

Palladium-based (Pd-based) membranes have demonstrated high selectivity and good permeability. Yet, in the presence of hydrogen below 295° C., pure palladium membranes may become brittle and can be prone to rupture due to the β-hydride phase transition. In order to reduce the effects of hydrogen embrittlement, Pd-based membranes are often alloyed with gold (Au), silver (Ag), yttrium (Y), copper (Cu), ruthenium (Ru), or indium (In). By alloying, the usage of palladium (Pd) is decreased and the physical strength is increased. Additionally, a major challenge to Pd alloy membranes is the presence of sulfur (S)-containing compounds, such as hydrogen sulfide ($H_2S$) and carbonyl sulfide (COS), at elevated temperatures that can poison the membrane. Alloying Pd with either Cu, Au, Pt or In/Ru can increase the sulfur tolerance of the membrane. The hydrogen permeability, and chemical and thermal stability, of the membrane can also be increased by alloying Pd with elements, such as Ag, Cu, Au, Pt, In, Ru, Y, and Rh. Embodiments herein may accommodate Pd alloys that are binary, tertiary, quaternary, etc. Implementations of the present techniques may reduce the impact of the quality of the porous support on the quality of the palladium-alloy membrane fabricated on the support because, as discussed, the ultrathin metal leaf may generally bridge and cover large defects and rough surfaces. In contrast, without the metal leaf applied directly to the support, additional processing cost may be incurred. In other words, such large defects and rough surfaces of the porous support may typically be modified to produce a smoother surface with fewer defects prior to depositing the selective palladium or palladium-alloy layer directly to the support.

In summary, implementations may fabricate a thin, generally defect-free membrane on a porous support by applying an ultrathin (e.g., <100 nm thick) metal foil ("leaf") that covers the pores and is annealed to hermetically seal the pores. Then, an ultrathin palladium layer is deposited onto the thin metal layer and a palladium alloy is formed by annealing to promote metallic interdiffusion between the metal leaf and the palladium layers. The techniques may reduce the cost of the membrane by reducing the amount of expensive materials (e.g., palladium and gold) used to fabricate the membrane. Implementations may also increase membrane performance due to reduced membrane thickness. Some embodiments may give membranes that are approximately $1/10^{th}$ to $1/100^{th}$ the thickness of typical state-of-the-art supported thin-film palladium membranes. Again, certain implementations apply a gold leaf directly onto a tubular porous alumina substrate, and then the gold leaf disposed on the substrate is annealed. Thereafter, a layer of palladium is applied to the annealed gold leaf, and the resulting bilayer is annealed to form a Pd—Au alloy. As for composition of this Pd—Au alloy membrane, the weight percent of Au may be, for example, between 5% and 45%. The composition may include small or trace amounts of palladinite (palladium oxide, PdO), as well as small or trace amounts of residual elemental Au and Pd still present in the film. The composition may be confirmed, for example, by x-ray diffraction.

As discussed, the metal leaf may be applied directly to the porous substrate to cover the substrate prior to application of Pd or Pd alloy. The metal leaf as a very thin film may cover and seal the pores in the substrate. Therefore, the amount of expensive precious metal (Pd) applied to form the membrane may be less than for other fabricated state-of-the-art hydrogen-selective membranes. As discussed below, implementations also provide for addressing defects, pinholes or pores in an existing membrane or existing metal film to be covered and sealed in repair.

As for annealing the metal leaf (e.g., Au) and annealing the subsequent multi-layer of the annealed metal leaf and additional metal(s) (e.g., Pd) applied to the annealed metal leaf, the annealing performed in air can be effective and, in particular implementations, reduce processing cost compared to other annealing atmospheres or gases. However, the annealing may be in an inert atmosphere, hydrogen atmosphere, or under vacuum, and the like.

An embodiment is a hydrogen-selective membrane having a membrane support (e.g., porous) that is hydrogen permeable. The membrane support (e.g., tubular, planar, etc.) may be ceramic, metal, or polymer, or any combinations thereof. The hydrogen-selective membrane includes an alloy disposed on the membrane support. The alloy includes an alloy of a first metal and a second metal. The first metal (e.g., gold) is from a metal leaf (e.g., gold leaf) that was disposed directly on the membrane support and annealed. The second metal (e.g., palladium) is from a hydrogen-permeable metal (e.g., palladium) that was disposed on the annealed metal leaf. The alloy (e.g., gold-palladium alloy) is formed by annealing the resulting bilayer structure of the hydrogen-permeable metal disposed on the underlying already-annealed metal leaf. The alloy may have a thickness less than 400 nm. The alloy may be the membrane material on the underlying support. Thus, the portion of the hydrogen-selective membrane not including the membrane support may have a thickness less than 400 nm.

Figure 3:
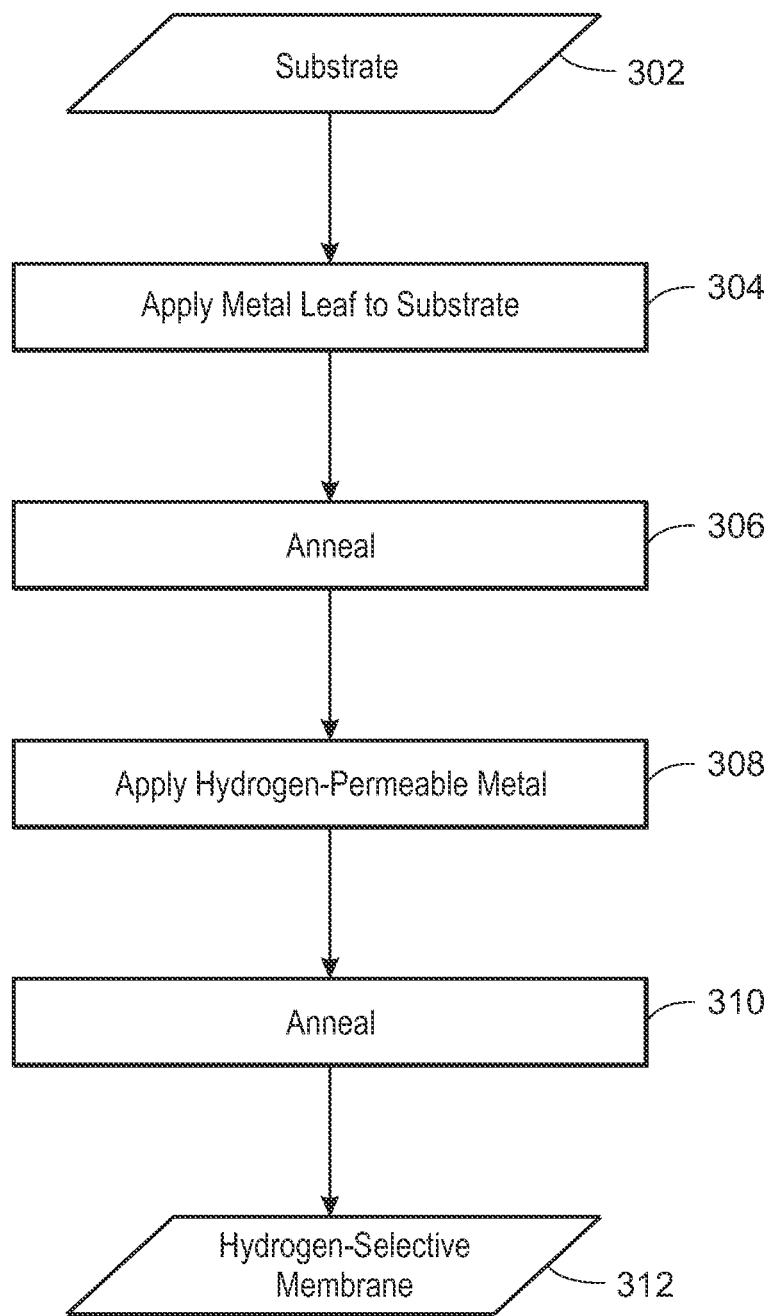
FIG. 3 is a block flow diagram of a method of fabricating a hydrogen-selective membrane.

FIG. 3 is a method 300 of fabricating a hydrogen-selective membrane. The method may receive a substrate, as indicated by reference numeral 302. The substrate may be a membrane support for the hydrogen-selective membrane. The substrate may be hydrogen permeable and may be porous. The substrate may be a tubular support or a planar support, or a support having another geometry or irregular shape. The substrate may be ceramic, metal, or polymer, or any combinations thereof. The substrate (membrane support) may be a porous ceramic, porous metal, hydrogen-permeable metal, or hydrogen-permeable polymer, or any combinations thereof.

At block 304, the method includes applying a metal leaf to the substrate. The metal leaf may be applied directly to the substrate. The metal leaf as applied may cover at least a portion of the substrate. The metal leaf (e.g., a metal-leaf sheet) may cover the substrate to form a generally continuous, nonporous membrane. The metal leaf may be ultrathin, such as less than 200 nm. The metal leaf may be also called an ultrathin metal foil or an ultrathin metal sheet. The metal leaf may have a thickness less than 400 nm, less than 200 nm, less than 150 nm, or less than 100 nm. The metal leaf may be, for example, gold (e.g., gold foil), silver, platinum, or copper. The metal leaf may be a gold leaf, a silver leaf, a platinum leaf, or a copper leaf. The metal leaf may be high purity, such as greater than 99.9 weight percent (wt %) in the given metal. For instance, a gold leaf may be at least 99.9 wt % gold. For more than one sheet of the metal leaf applied, the cumulative thickness of the sheets may be, for example, less than 400 nm, less than 200 nm, less than 150 nm, or less than 100 nm.

To apply the metal leaf to the substrate, the metal leaf may be transferred from its substrate (e.g., paper) onto the membrane substrate. The applying of the metal leaf may involve pressing the metal leaf against the substrate by hand or with a tool (e.g., brush). Then, in some implementations, another tool (e.g., an agate-tipped burnishing tool) may be employed to smooth the metal leaf (thin foil) over the surface of the substrate for better adherence. For the substrate as a tubular membrane support, the applying of the metal leaf may involve wrapping the metal leaf radially around the substrate (see, e.g., FIG. 1), and two ends of the metal leaf may overlap (see, e.g., FIG. 2).

At block 306, the method includes annealing the metal leaf on the substrate to give an annealed metal leaf on the substrate. To anneal the metal leaf, the metal leaf and underlying substrate may be placed in an oven or furnace. The annealing may be in air, nitrogen, or hydrogen. The gas may be pressurized. On the other hand, the annealing may be under vacuum. The annealing may be in an inert atmosphere. The annealing of the metal leaf on the substrate to give the annealed metal leaf may be performed at a temperature of at least 500° C. for at least 5 hours. The annealing temperature may be, for example, at least 550° C. or at least 600° C., or in a range of 500° C. to 700° C. The annealing duration may be, for example, at least 5 hours, at least 6 hours, at least 10 hours, at least 12 hours, or at least 16.5 hours, or in a range of 6 hours to 24 hours. For implementations in which the substrate is tubular, the annealing may provide heat to diffusion-bond the aforementioned two overlapping end portions to each other to hermetically seal the annealed metal leaf radially around the substrate.

With respects to blocks 304 and 306, the applying and annealing of the metal leaf directly on the substrate may reduce the amount or thickness of the hydrogen-permeable metal applied. In other words, the ultrathin metal leaf may effectively prepare the substrate so that the hydrogen-permeable metal is generally not applied directly to the substrate. In contrast, instances of the hydrogen-permeable metal applied directly to the substrate (without an intervening annealed metal leaf) could utilize more hydrogen-permeable metal.

At block 308, the method includes applying a hydrogen-permeable metal to the annealed metal leaf on the substrate. Thus, the thickness of the hydrogen-permeable metal may be less than if the hydrogen-permeable metal were applied directly to the substrate instead of as applied here to the annealed metal leaf on the substrate. In implementations, a thin layer (e.g., less than 200 nm thickness) of the hydrogen-permeable metal (e.g., palladium) is applied (e.g., coated, deposited, plated, etc.) onto an external surface of the annealed metal leaf. The hydrogen-permeable metal may be, for example, palladium or a palladium alloy. Metal-deposition techniques, such as physical vapor deposition (e.g., magnetron sputtering or electron-beam evaporation), chemical vapor deposition, electroless plating, or electroplating, may be employed to apply the hydrogen-permeable metal to the annealed metal leaf disposed on the substrate. More than one layer of the hydrogen-permeable metal may be applied.

At block 310, the method includes annealing the hydrogen-permeable metal and the annealed metal leaf to give an alloy of the hydrogen-permeable metal and the metal leaf, wherein the hydrogen-selective membrane (noted with reference numeral 312) as fabricated includes the alloy disposed on the substrate. The annealing conditions may be similar or the same as the annealing conditions for the annealing (block 306) of the metal leaf discussed above. The alloy formed in block 310 may be considered the membrane material and have a thickness, for example, less than 800 nm or less than 400 nm. In implementations with the metal leaf as a gold leaf and the hydrogen-permeable metal as palladium or palladium alloy, the alloy formed via the annealing at block 310 includes an alloy of gold and palladium. In some implementations, the alloy may include metals in the alloy in addition to gold and palladium. The annealing in block 310 may give the hydrogen-selective membrane 312.

An embodiment is a method of fabricating a hydrogen-selective membrane. The method includes applying a metal leaf that is a first metal to a substrate. The substrate may be hydrogen permeable. The substrate may be porous. The substrate may be a membrane support of the hydrogen-selective membrane. In certain implementations, the substrate is tubular or cylindrical, and wherein applying the metal leaf involves wrapping the metal leaf radially around the substrate. The metal leaf that is the first metal may be, for example, gold, silver, platinum or copper. In implementations, the metal leaf has a thickness less than 200 nm. The method includes annealing the metal leaf on the substrate to give an annealed metal leaf on the substrate. Then, a hydrogen-permeable metal that includes a second metal is applied to the annealed metal leaf. In implementations, the hydrogen-permeable metal that includes the second metal includes palladium and has a thickness less than 200 nm. The method includes annealing the hydrogen-permeable metal and the annealed metal leaf to give an alloy of the first metal and the second metal (e.g., palladium or palladium alloy), wherein the hydrogen-selective membrane fabricated includes the alloy disposed on the substrate. In some implementations, the first metal is gold and the second metal is or includes palladium. The annealing conditions, such as temperature, duration, and atmosphere, may be as previously discussed.

Another embodiment is a method of fabricating a hydrogen-selective membrane, including applying a metal leaf to a substrate. The applying of the metal leaf may involve pressing the metal leaf against the substrate by hand or with a tool. The substrate may be a tubular support or a planar support. The substrate may be porous. The substrate may be hydrogen permeable. The substrate may be a membrane support of the hydrogen-selective membrane. The metal leaf may be, for example, a gold leaf, a silver leaf, a platinum leaf, or a copper leaf. In certain implementations, the metal leaf includes gold or is a gold leaf. The metal leaf may have a thickness, for example, less than 200 nm or less than 100 nm. The method includes annealing the metal leaf on the substrate to give an annealed metal leaf on the substrate. The annealing of the metal leaf on the substrate to give the annealed metal leaf may be performed, for example, at a temperature of at least 500° C. for at least 5 hours. The method includes applying a hydrogen-permeable metal (e.g., including palladium) to the annealed metal leaf on the substrate. The method includes annealing the hydrogen-permeable metal and the annealed metal leaf to give an alloy of the hydrogen-permeable metal and the metal leaf, wherein the hydrogen-selective membrane includes the alloy disposed on the substrate. In some implementations, the hydrogen-permeable metal includes palladium, and wherein the alloy includes an alloy of gold and palladium. In implementations, the annealing of the hydrogen-permeable metal and the annealed metal leaf to give the alloy is performed at a temperature of at least 500° C. for at least 5 hours.

As discussed, embodiments may initially apply directly to a substrate a very thin film of metal leaf (e.g., <100 nm thick) that is impermeable to gases. Then, the metal leaf may be annealed. Subsequently a layer of material (e.g. palladium) that is permeable to specific gases (e.g. hydrogen) is applied to the annealed metal-leaf film. Then, the structure including the layer of material and the underlying annealed metal-leaf film is annealed. In some implementations of this latter annealing, a hydrogen-permeable layer of Pd—Au alloy is formed by the annealing to create the alloy (e.g., palladium-gold). An advantage may be that a much thinner membrane can be fabricated than conventional, which may have dual benefits of being less expensive and more permeable to hydrogen. Moreover, implementations may utilize a single nonporous sheet of gold leaf that is relatively larger (surface area) to cover the most or all of the surface of porous membrane support instead of applying narrower strips of metal leaf or film, thereby reducing the number of overlapping joints to be sealed.

Very thin and high-purity metal leaf products may be readily commercially available. In contrast, large surface areas of freestanding palladium or palladium alloy thin films are typically fabricated utilizing expensive, labor intensive techniques, such as cold rolling, magnetron sputtering, and electroless plating. The lower limit in thickness of defect-free palladium films formed by such techniques may be, for example, about 1 μm to 5 μm, whereas less-expensive metal leaf with thicknesses of <200 nm or <100 nm are commonly manufactured by stamping and are commercially available. Further, gold, copper, and silver are more malleable than palladium and palladium alloys. Therefore, ultrathin foils (metal leafs) of gold, copper, and silver may be more easily applied onto a surface while maintaining form because these foils may conform readily to the surface. In contrast, thin films of palladium or palladium alloy may not adhere as readily to the surface of a porous substrate due to thin-film thickness and/or lack of ductility. That may make it more difficult to apply a thin foil of palladium or palladium alloy uniformly onto the surface of a porous substrate.

To fabricate large surface areas of continuous, pinhole-free films of palladium and palladium alloys that are <1 μm thick may be difficult. Furthermore, to deposit or apply such films onto hydrogen permeable materials such as porous metal or metal oxide substrates without observing any defects in the film (including when utilizing well known methods such as physical and chemical vapor deposition, electroless plating, or electroplating) may also be difficult. In fact, for these deposition methods, it is generally accepted that the thickness of a coating must be several times the diameter of the average pore size in order to become continuous to effectively seal the pores. Conversely, by applying an ultrathin foil ("leaf") onto the surface, embodiments herein may avoid or reduce the problem of building up a thick layer of solid material to block the pores because the thin metal leaf is already generally continuous and can typically span the pores. Because of its malleability, metal leaf may also be easier or more effective to apply over defects in an existing palladium film and better at adhering to the palladium around the edges of the foil, thereby sealing off the pinholes upon annealing. Another advantage is that embodiments may render a non-conducting surface (such as a porous ceramic membrane substrate) electrically conductive, which can make possible to electroplate an additional coating (e.g., palladium) over the metal film. Advantageously, electroplating palladium onto a conductive surface may avoid the necessity of activating a non-conductive surface with a catalyst to promote the electroless plating deposition method, which is often used to deposit membrane films. Lastly, the aforementioned alloys of the applied metal leaf and the hydrogen-permeable metal to give (form) the hydrogen-selective membrane material may include three or more metals, such as ternary palladium alloys (e.g., Pd—Pt—Au) and with different compositions. Moreover, implementation of production of these alloys may avoid certain complicated techniques such as sputtering but instead produce the alloys more easily via co-deposition (e.g., Pd—Pt) and then annealed in combination with the metal leaf (e.g., gold foil). Furthermore, such may facilitate to fabricate with varying thickness and compositions in a controlled manner.

An existing supported thin-film palladium membrane may be repaired via certain embodiments of the present techniques to treat defects, such as pinholes, in the palladium membrane material. For instance, a metal leaf (e.g., gold leaf) may be applied to the palladium or palladium alloy of an existing hydrogen-selective thin-film membrane to cover the defects. Then, the membrane with the applied metal leaf annealed to fill-in the defects. The metal leaf may be, for example, a gold leaf, a silver leaf, a platinum leaf, or a copper leaf. The metal leaf may have a thickness of less than 200 nm, less than 150 nm, or less than 100 nm. As mentioned, the applied metal leaf and underlying palladium or palladium alloy may be annealed (e.g., in air). The annealing conditions may be, for example, at least 550° C. (or at least 600° C.) for at least 12 hours or at least 16.5 hours. In some implementations, a single sheet or layer of metal leaf is applied. In other implementations, more than one sheet or layer of metal leaf is applied. If multiple sheets of metal leaf are applied, annealing of the structure may be performed after application of each metal-leaf sheet or after application of more than one metal-leaf sheet. Lastly, if more than one metal leaf is applied or more than one sheet of metal leaf is applied, the cumulative thickness of the metal leaf may be less than 400 nm, less than 300 nm, less than 200 nm, or less than 150 nm. In certain implementations, the metal leaf is gold leaf. Thus, the annealing may form a palladium-gold alloy or incorporate the gold leaf into an existing palladium alloy.

In the Example of repair below, a gold leaf (gold foil) was applied onto a pure Pd membrane. In other repairs, gold leaf can also be applied onto bimetallic palladium-alloy membranes such as Pd—Pt (e.g., with Pt content in the range of 5 wt % to 30 wt %) or Pd—Ru (e.g., with Ru content in the range of 0.3 wt % to 10 wt %), or other alloys with palladium. The bimetallic membrane can be manufactured utilizing synthesis methods, such as electroless plating, electroplating, sputtering, or chemical vapor deposition. Also, similar to gold foil, an ultrathin copper foil, ultrathin silver foil, or ultrathin platinum foil can be utilized in preparing binary or ternary alloy membranes by application onto a pure palladium or palladium alloy film.

Figure 4:
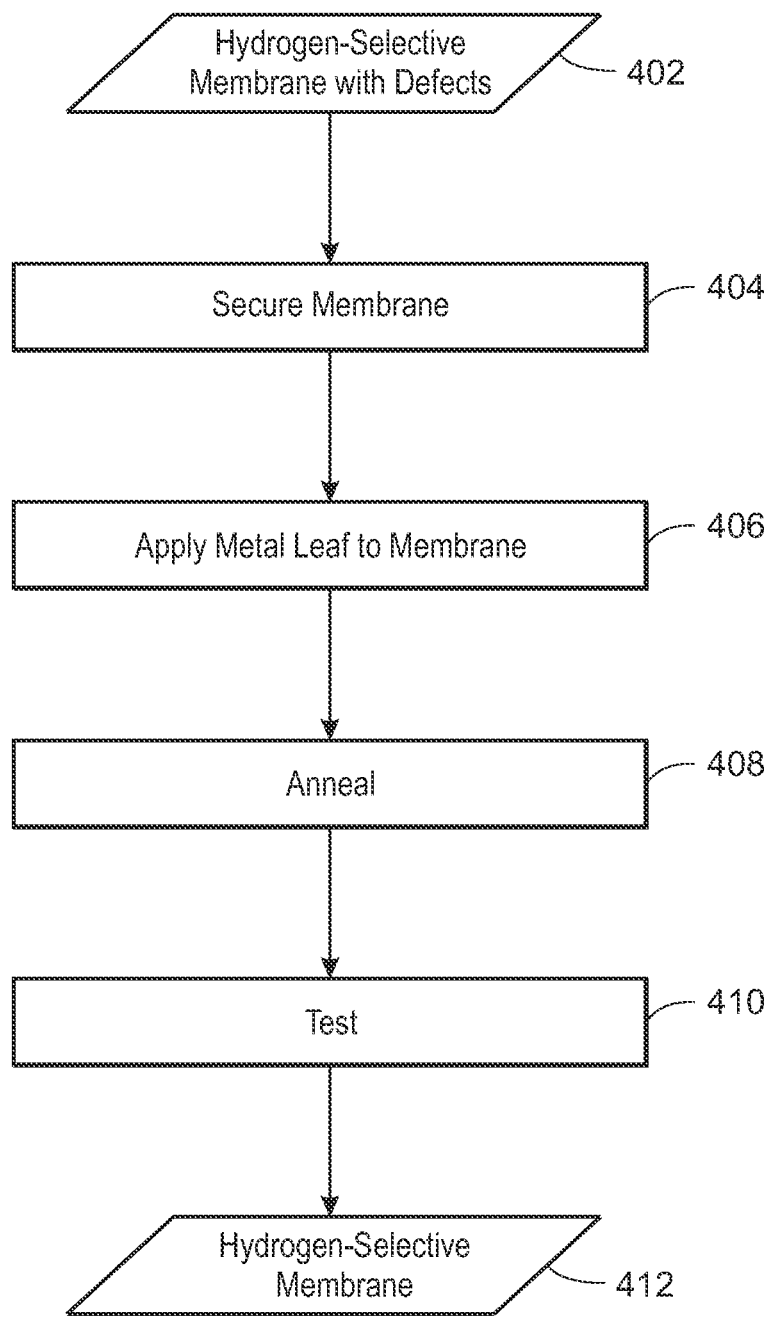
FIG. 4 is a block flow diagram of a method of repairing a hydrogen-selective membrane having defects.

FIG. 4 is a method 400 of repairing (treating) a hydrogen-selective membrane having defects. The method may receive the hydrogen-selective membrane, as indicated by reference numeral 402. The hydrogen-selective membrane may have a membrane support. The membrane support may be, for example, planar or tubular. In some implementations, the hydrogen-selective membrane is a tubular membrane. The hydrogen-selective membrane may have membrane material disposed on the membrane support. The defects may be, for example, pinholes that leak gas (other than the desired hydrogen) through the membrane material.

At block 404, the method includes securing the hydrogen-selective membrane for repair, such as for applying (block 406) the metal leaf. For instance, the hydrogen-selective membrane may be clamped or otherwise secured in a vice or other structure. For a tubular membrane, a pipette may hold the membrane. In some embodiments, the tubular membrane may be placed on a rod and allowed to rotate freely when desired, such as for applying the metal leaf in block 406. In some instances, the hydrogen-selective membrane may be removed from the securing apparatus when desired to place the hydrogen-selective membrane in an oven or furnace for the annealing in block 408.

At block 406, the method includes applying a metal leaf to an external surface of membrane material of the hydrogen-selective membrane having defects. The membrane material is metal (e.g., palladium or a palladium alloy) that is hydrogen selective and has the defects. The membrane material may be an exterior layer of the hydrogen-selective membrane. The applying of the metal leaf may cover the defects. The metal leaf may be, for example, a gold metal leaf, a silver metal leaf, a platinum metal leaf, or a copper metal leaf. More than one metal leaf may be applied.

At block 408, the method includes annealing the metal leaf and the metal to form an alloy of the metal leaf and the metal to repair the defects. Thus, the method may include repairing the defects by forming the alloy. The annealing may be performed at a temperature of at least 500° C., at least 550° C., or at least 600° C. The annealing may be performed for at least 5 hours, at least 10 hours, at least 12 hours, or at least 16 hours.

After the annealing, an option is to return to block 406 and apply an additional metal leaf and in which the structure can be annealed (again) in block 408. Multiple such iterations may be performed. An iteration of an additional metal leaf (in block 406) in conjunction with additional annealing (in block 408) for that additional metal leaf may be implemented, for example, in response to the testing in block 410 demonstrating that defects or leaks remain.

The defects may be, for example, pinholes in the metal (e.g., palladium or a palladium alloy) that is the membrane material of the hydrogen-selective membrane having the defects. The repairing of the defects may involve filling the pinholes with the alloy formed via the annealing. The repairing of the defects may involve plugging the pinholes with the alloy. The defects repaired can include gaps or pores, or other irregularities.

In some implementations, the membrane material having the defects is palladium or palladium alloy, the metal leaf is a gold metal leaf, and the alloy formed in the annealing (block 408) includes an alloy of gold and palladium. Additional metals may be alloyed in the gold-palladium alloy.

The annealing in block 408 may give the repaired hydrogen-selective membrane noted by reference numeral 412. However, the repaired hydrogen-selective membrane may be subjected to testing, as noted in block 410. If testing in block 410 indicates that substantial defects remain, the hydrogen-selective membrane may be again subjected to the actions of blocks 406 and 408.

At block 410, the method includes testing the repair. The testing of the repair may involve checking for leaks of gas other than hydrogen through the membrane material and membrane support. The gas may be, for example, nitrogen or argon, and applied under pressure. In implementations, the membrane lumen (inner diameter) may be pressurized with the gas (e.g., nitrogen, argon, etc.) and the membrane submerged in water to observe any gas bubbles emerging from pinholes in the membrane material (film).

An embodiment is a method of repairing a hydrogen-selective membrane having defects. The method includes applying a metal leaf (e.g., including gold metal) to an external surface of membrane material of the hydrogen-selective membrane having defects, wherein applying the metal leaf may cover the defects. The metal leaf may be a gold leaf, a silver leaf, a platinum leaf, or a copper leaf. The metal leaf may be or include gold. The membrane material includes metal (e.g., palladium or a palladium alloy) that is hydrogen selective and has the defects. The method includes annealing the metal leaf and the metal to form an alloy of the metal leaf and the metal to repair the defects. In certain implementations, the alloy includes gold and palladium. The alloy may be an alloy of gold and palladium. The alloy may be an alloy of gold, palladium, and another metal(s). Other alloys are applicable. The method may give repairing the defects by forming the alloy. In implementations, the annealing is at a temperature of at least 500° C. for at least 5 hours, or at a temperature of at least 550° C. for at least 10 hours. The hydrogen-selective membrane may include a membrane support, wherein the membrane material includes an exterior layer of the hydrogen-selective membrane. The defects may include pinholes in the membrane material. The repairing of the defects may involve covering, filling, or plugging the pinholes with the alloy. The method includes testing the repair. The testing of the repair may involve checking for leaks of gas other than hydrogen through the membrane material and membrane support of the hydrogen-selective membrane.

EXAMPLE

A supported thin-film palladium membrane (having defects) on a porous alumina substrate was repaired. The defects included pinholes that caused flow of gas through the membrane other than hydrogen, which may be characterized as leaks. Nitrogen may be employed as a test gas to check for leaks and the leak rate. The repair relied on gold leaf, annealing, and checking for leaks. The repair demonstrated a decreased leak rate after each application of gold. The membrane showed decreased leak rate after each application of gold leaf onto the thin-film palladium membrane supported on the porous alumina substrate. The nitrogen leak rate through the membrane decreased with each successive step that consisted of applying a single layer of gold leaf and then annealing in air at 600° C. for 12 hours or 16.5 hours. The nitrogen leak rate and hydrogen flux through the membrane may be confirmed at typical membrane operating temperatures (e.g., in a range of 450° C. to 600° C.).

For the Example, the supported thin-film palladium membrane was fabricated by employing electroless deposition to coat a porous alumina tube with a thin (~5 μm thick) palladium film. The palladium film completely covered the outer surface of the porous alumina tube, but as mentioned, the film contained defects in the form of pinholes that allowed gas to permeate through the film. The tube was affixed to the end of a disposable plastic pipette to hold the membrane firmly while a sheet of gold leaf was applied onto the surface of the palladium film (the membrane could also be placed on a rod and allowed to rotate freely while the metal leaf is applied). Annealing was carried out at a temperature of 500° C. for a duration of 5 hours, which was found to be inadequate for gold leaf applied over the supported thin film palladium membrane, because the gold was not well adhered to the palladium. As indicated above, a temperature of 600° C. and a duration of 12 hours resulted in much better adherence. An additional layer of gold was applied onto the surface of the membrane and rubbed on gently using an agate-tipped burnishing tool. The membrane was annealed again at 600° C. for 16.5 hours in air and allowed to furnace cool. After each application of gold leaf and annealing, the membrane lumen (inner diameter) was pressurized with argon and the membrane was submerged in water to observe any gas bubbles emerging from pinholes in the film. After each application of gold leaf and anneal, the number and size of pinholes decreased.

A number of implementations have been described. Nevertheless, it will be understood that various modifications may be made without departing from the spirit and scope of the disclosure.

What is claimed is:

1. A method of fabricating a hydrogen-selective membrane, comprising:
    applying a metal leaf to a substrate;
    annealing the metal leaf on the substrate to give an annealed metal leaf on the substrate;
    applying a hydrogen-permeable metal to the annealed metal leaf on the substrate; and
    annealing the hydrogen-permeable metal and the annealed metal leaf to give an alloy of the hydrogen-permeable metal and the metal leaf, wherein the hydrogen-selective membrane comprises the alloy disposed on the substrate.

2. The method of claim 1, wherein the metal leaf comprises a gold leaf having a thickness less than 150 nanometers (nm).

3. The method of claim 1, wherein the metal leaf is a gold leaf, a silver leaf, a platinum leaf, or a copper leaf, wherein the metal leaf comprises a thickness less than 200 nm, and wherein the substrate is porous.

4. The method of claim 1, wherein the substrate comprises a tubular support or a planar support.

5. The method of claim 1, wherein applying the metal leaf comprises pressing the metal leaf against the substrate by hand or with a tool, wherein the substrate is hydrogen permeable, and wherein the substrate is a membrane support of the hydrogen-selective membrane.

6. The method of claim 1, wherein the annealing of the metal leaf on the substrate to give the annealed metal leaf is performed at a temperature of at least 500° C. for at least 5 hours.

7. The method of claim 1, wherein the metal leaf comprises a gold leaf, wherein the hydrogen-permeable metal comprises palladium, and wherein the alloy comprises an alloy of gold and palladium.

8. The method of claim 1, wherein the annealing of the hydrogen-permeable metal and the annealed metal leaf to give the alloy is performed at a temperature of at least 500° C. for at least 5 hours, and wherein the hydrogen-permeable metal comprises palladium.

9. A method of fabricating a hydrogen-selective membrane, comprising:
    applying a metal leaf comprising a first metal to a substrate;
    annealing the metal leaf on the substrate to give an annealed metal leaf on the substrate;
    applying a hydrogen-permeable metal comprising a second metal to the annealed metal leaf; and
    annealing the hydrogen-permeable metal and the annealed metal leaf to give an alloy of the first metal and the second metal, wherein the hydrogen-selective membrane comprises the alloy disposed on the substrate.

10. The method of claim 9, wherein the metal leaf comprising the first metal comprises gold, silver, platinum or copper, and wherein the substrate is hydrogen permeable.

11. The method of claim 9, wherein the metal leaf comprises a thickness less than 200 nanometers (nm), wherein the substrate is porous, and wherein the substrate is a membrane support of the hydrogen-selective membrane.

12. The method of claim 9, wherein the substrate is tubular, and wherein applying the metal leaf comprises wrapping the metal leaf radially around the substrate.

13. The method of claim 9, wherein the hydrogen-permeable metal comprising the second metal comprises palladium and a thickness less than 200 nanometers (nm).

14. The method of claim 9, wherein the first metal comprises gold, wherein the second metal comprises palladium.

\* \* \* \* \*